(12) United States Patent
Ocejo et al.

(10) Patent No.: US 10,536,527 B2
(45) Date of Patent: Jan. 14, 2020

(54) METHOD AND SYSTEM FOR DATA LOGGING IN A TRANSPORT REFRIGERATION SYSTEM THAT INCLUDES A HUMAN-MACHINE INTERFACE

(71) Applicant: THERMO KING CORPORATION, Minneapolis, MN (US)

(72) Inventors: Luis Ramon Ocejo, St. Feliu de Llobregat (ES); Miguel A. Ferrer, St. Feliu de Llobregat (ES); Kirk Spencer, Richfield, MN (US)

(73) Assignee: Thermo King Corporation, Minneapolis, MN (US)

( * ) Notice: Subject to any disclaimer, the term of this patent is extended or adjusted under 35 U.S.C. 154(b) by 416 days.

(21) Appl. No.: 14/907,708

(22) PCT Filed: Jul. 25, 2014

(86) PCT No.: PCT/US2014/048131
§ 371 (c)(1),
(2) Date: Jan. 26, 2016

(87) PCT Pub. No.: WO2015/013577
PCT Pub. Date: Jan. 29, 2015

(65) Prior Publication Data
US 2016/0182640 A1    Jun. 23, 2016

(30) Foreign Application Priority Data
Jul. 26, 2013    (EP) ..................................... 13178158

(51) Int. Cl.
G06F 13/00    (2006.01)
H04L 29/08    (2006.01)

(52) U.S. Cl.
CPC .................................. *H04L 67/12* (2013.01)

(58) Field of Classification Search
CPC ................. H04L 29/06; H04L 29/0809; H04L 29/08072; H04L 29/08981; H04L 63/08;
(Continued)

(56) References Cited

U.S. PATENT DOCUMENTS 5,487,278 A    1/1996    Hilleveld et al.
5,999,091 A    12/1999    Worthman
(Continued)

FOREIGN PATENT DOCUMENTS

WO    WO 2012/021377 A2 *    2/2012    ............. F25D 29/00

OTHER PUBLICATIONS

Omega "OMG-USB-485-1 Single Port RS-422/485/530 to USB Adaptor" pp. 1-21, Published 2002.*
(Continued)

*Primary Examiner* — Robert B Harrell
(74) *Attorney, Agent, or Firm* — Hamre, Schumann, Mueller & Larson, P.C.

(57) ABSTRACT

Methods and systems for controlling the collection and storage of data are described. In general, the system includes a human-machine interface (HMI), and the HMI includes an interface that is configured to receive and connect with an external device. Generally, the methods and systems involve the use of an external storage device that can store, for example, collected data and/or analyzed data.

15 Claims, 4 Drawing Sheets

(58) Field of Classification Search
CPC ....... H04L 67/12; G06F 21/31; G06F 21/629; G06F 21/6218; G06F 2221/2141; G06F 3/038; G06F 3/0383; G06F 3/0481; G06F 3/0482; G06F 3/0601; G06F 3/0635; G06F 3/0689; G06F 9/4443; G06F 13/38; G06F 13/385; G06F 13/387; G06F 13/4022; G06F 13/4027; G06F 13/4072; G06F 17/30; G06F 2203/04805; G06F 2203/04806; G06Q 30/02; F25D 29/00; F25D 29/003; F25D 2400/361; G01G 19/005; G05F 21/00
USPC ............. 709/217; 726/21; 710/63, 305, 316; 715/815
See application file for complete search history.

(56) References Cited

U.S. PATENT DOCUMENTS

| | | | |
|---|---|---|---|
| 6,601,124 B1 * | 7/2003 | Blair | ........................ G06F 13/38 710/305 |
| 8,156,750 B2 | 4/2012 | Butorac et al. | |
| 8,334,781 B2 | 12/2012 | Heck et al. | |
| 2002/0104323 A1 | 8/2002 | Rash et al. | |
| 2008/0291850 A1 | 11/2008 | Jensen | |
| 2009/0084119 A1 | 4/2009 | Lifson et al. | |
| 2010/0024450 A1 | 2/2010 | Waldschmidt | |
| 2010/0274604 A1 | 10/2010 | Crilly | |
| 2011/0291828 A1 | 12/2011 | Walker et al. | |
| 2011/0302942 A1 | 12/2011 | Birchard | |
| 2012/0041602 A1 | 2/2012 | Klinger | |
| 2012/0278454 A1 | 11/2012 | Stewart et al. | |
| 2013/0145460 A1 * | 6/2013 | Dudley | ................ F25D 29/003 726/21 |

OTHER PUBLICATIONS

International search report for International application No. PCT/US2014/048131, dated Nov. 7, 2014 (3 pages).

Written opinion for International application No. PCT/US2014/048131, dated Nov. 7, 2014 (8 pages).

* cited by examiner

METHOD AND SYSTEM FOR DATA LOGGING IN A TRANSPORT REFRIGERATION SYSTEM THAT INCLUDES A HUMAN-MACHINE INTERFACE

The embodiments disclosed herein relate generally to a transport refrigeration system (TRS). More particularly, the embodiments relate to methods and systems for controlling the collection and storage of data in a TRS.

BACKGROUND

Existing transport refrigeration systems are used to cool trailers (e.g., trailer on flat cars, etc.), containers (e.g., containers on flat cars, intermodal containers, etc.), trucks, box cars and other similar transport units (typically referred to as a "refrigerated transport unit"). When cargo in the transport unit includes perishable products (e.g., food product, flowers, etc.), the temperature of the refrigerated transport unit must be controlled to prevent loss of the cargo during shipment.

SUMMARY

The embodiments described herein are directed to a TRS. In particular, the embodiments described herein are directed to methods and systems for controlling the collection and storage of data in the TRS.

The methods and systems described herein generally involve the control of how data is collected and where the data is stored in the TRS. In some examples, the methods and systems further involve the control of how the collected data is transferred and analyzed.

In general, the methods and systems involve the use of an external storage device that can store, for example, the collected data and/or the analysis of the data. The methods and systems can generally provide a cost effective approach to, e.g., data logging. The term "data logging" means a process of collecting data, e.g., through the use of a sensor, analyzing the data and storing the data and/or the analyzed data.

In one embodiment, the TRS includes a plurality of sensors, a controller that receives data from the sensors and a human-machine interface (HMI) that is in communication with the controller. In some examples, the communication line between the HMI and the controller is a RS485 communication line.

In one example, the HMI includes an interface that is configured to receive and connect with an external device, for example, an external storage device. In some examples, the interface is accessible to a user so that a user can insert the external device into the HMI or detach the external device from the HMI. The detached external device then can be connected to another device, for example, a computer, so that the data stored in the external device can be read or exported to the computer. In some examples, the interface of the HMI includes a Universal Serial Bus (USB) interface that is configured to receive and connect with a USB device. The USB device can be, for example, a USB flash drive. In some examples, a computer or mobile device can be connected directly to the controller via the USB interface and pull and/or parse data from the controller for analysis. In some examples, data that is extracted from the controller may be transmitted to a control center, e.g., a central server, to collect a plurality of data logs for comparison between different TRSs, different TRS configurations, etc.

In some examples, the HMI includes a communication protocol to communicate with devices other than the TRS controller, for instance, an external database that is not included in the TRS. In some examples, the communication protocol is a wireless communication protocol, for instance, a Bluetooth protocol, a WiFi protocol, a cellular data protocol, a ZigBee protocol, etc.

In some examples, the controller is configured to transmit information to the HMI and/or the external device, e.g., the USB device, periodically.

One embodiment of the process of controlling the collection and storage of data includes collecting data using the controller, communicating the collected data to the HMI, and storing the collected data in the external device. In some examples, the process further includes analyzing the data using the controller. In some examples, the process further involves outputting the results regarding the collection and/or analysis, for example, set points, alarms, and/or temperatures, on the HMI. In some examples, the process further includes waiting for a predetermined time, and then repeating the above steps.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments described herein are directed to a transport refrigeration system (TRS). More particularly, the embodiments described herein relate to methods and systems for controlling the collection and storage of data in the TRS.

References are made to the accompanying drawings that form a part hereof, and in which is shown by way of illustration of the embodiments in which the methods and systems described herein may be practiced. The term "refrigerated transport unit" generally refers to, for example, trailers (e.g., trailer on flat cars, etc.), containers (e.g., containers on flat cars, intermodal containers, etc.), trucks, box cars and other similar transport units. The term "transport refrigeration system" or "TRS" refers to a refrigeration system for controlling the refrigeration of a conditioned interior space of the refrigerated transport unit. The term "TRS controller" refers to an electronic device that is configured to manage, command, direct and regulate the behavior of one or more TRS refrigeration components of a refrigeration circuit (e.g., an evaporator, a condenser, a compressor, an expansion valve (EXV), etc.), a genset, etc.

It will be appreciated that the embodiments described herein may be used in any suitable temperature controlled apparatus such as a trailer (e.g., trailer on flat car, etc.), a container (e.g., container on flat cars, intermodal container, etc.), a truck, a box car, an auxiliary power unit, etc. The TRS may be a vapor-compressor type refrigeration system, or any other suitable refrigeration system that can use refrigerant, cold plate technology, etc.

Figure 1:
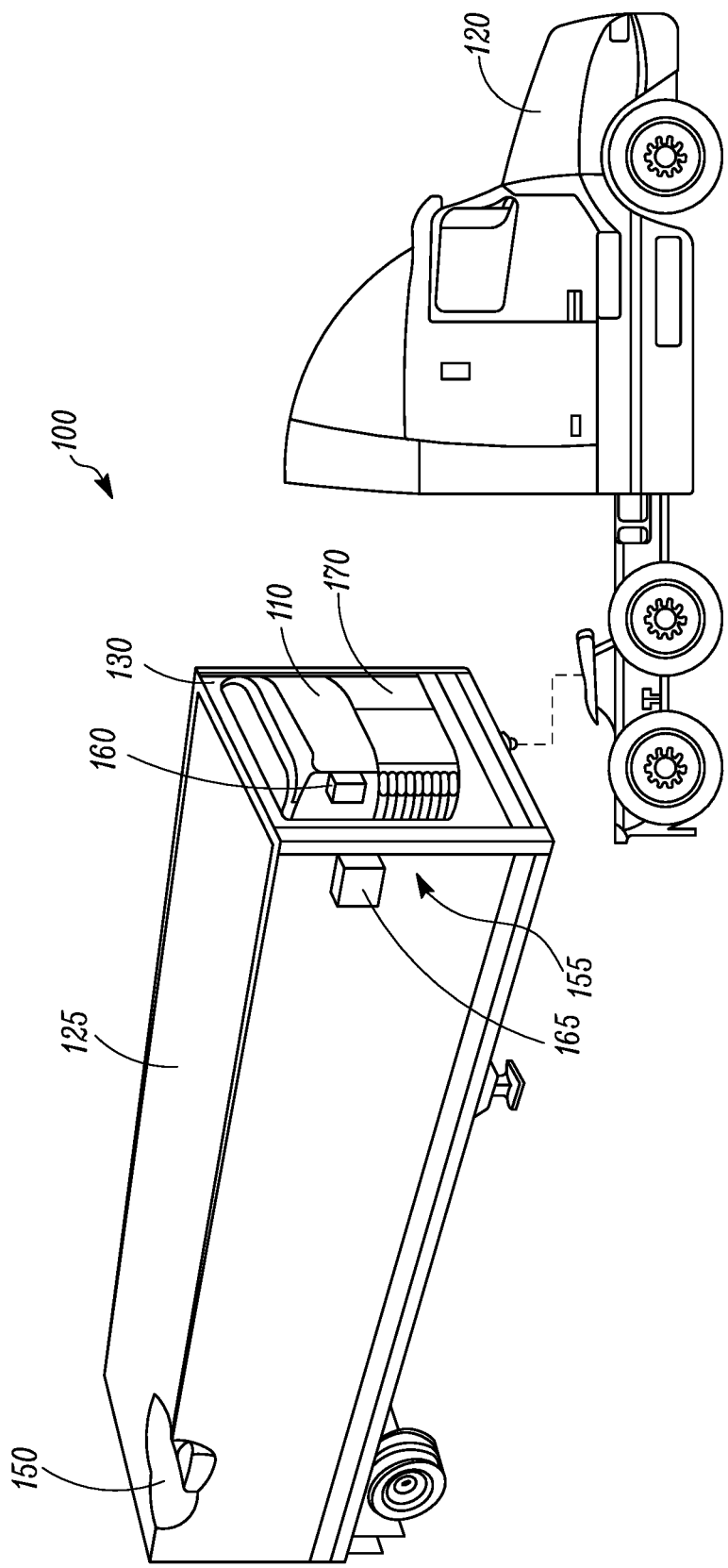
FIG. 1 illustrates a side view of a refrigerated transport unit attached to a tractor, according to one embodiment.

FIG. 1A illustrates one embodiment of a TRS 100 for a transport unit (TU) 125 that is attached to a tractor 120. The TRS 100 includes a TRU 110 that controls refrigeration within the TU 125. The TRU 110 is disposed on a front wall 130 of the TU 125. The tractor 120 is attached to and is configured to tow the transport unit 125. It will be appreciated that the embodiments described herein are not limited to trucks and trailer units, but can just as easily apply to any other suitable temperature controlled apparatuses such as a ship board container, an air cargo container or cabin, an over the road truck cabin, among others. The TRU 110 may comprise a programmable TRS Controller 241 that may comprise a single integrated control unit 160 or that may comprise a distributed network of TRS control elements 160, 165. The number of distributed control elements in a given network can depend upon the particular application of the principles described herein.

The TRU 110 is configured to be in communication with an internal space 150 and is also configured to control the temperature in the internal space 150. The components within the TRU 110 are described below with reference to FIGS. 2A and 2B, which illustrate a block diagram of components within the TRU 110.

Figure 2A:
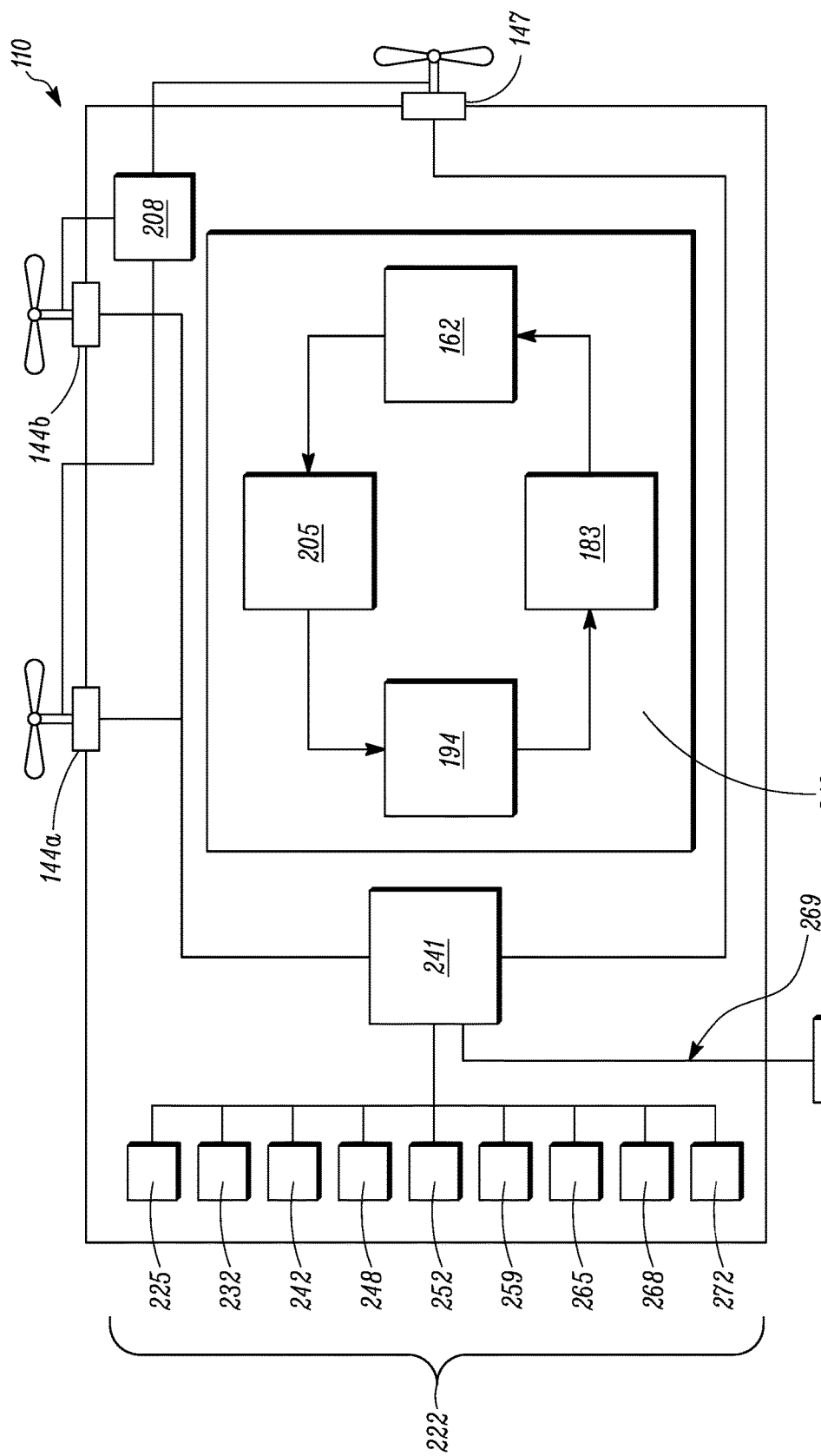
FIG. 2A illustrates a block diagram of a TRU, according to one embodiment.

Generally, as illustrated in FIG. 2A, the TRU 110 can include condenser fans 144a, 144b, an evaporator fan 147, a power source 208, a condenser 162, a compressor 183, an evaporator 194 and an expansion valve 205 as generally known in the art. The condenser 162 is in airflow communication with the condenser fans 144a, 144b, and the evaporator 194 is in airflow communication with the evaporator fan 147.

The TRS Controller 241 included in the TRU 110 is generally configured to control a refrigerant circuit 240 that includes the condenser 162, the expansion valve 205, the evaporator 194 and the compressor 183. In one example, the TRS Controller 241 controls the operating states of each of the condenser fans 144a, 144b and the evaporator fan 147. In another example, the TRS Controller 241 controls the refrigeration circuit 240 to obtain various operating conditions (e.g., temperature, humidity, etc.) of the internal space 150 as is generally understood in the art. The refrigeration circuit 240 regulates various operating conditions (e.g., temperature, humidity, etc.) of the internal space 150 based on instructions received from the TRS Controller 241.

With reference to FIG. 2A, the TRU 110 further can includes a plurality of sensors 222. The plurality of sensors 222 include a sensor 225 to detect a discharge pressure temperature saturation ($DPT_{SAT}$), a sensor 232 to detect a minimum pressure temperature saturation ($MPT_{SAT}$), a sensor 242 to detect a minimum discharge pressure ($DP_{MIN}$), a sensor 248 to detect an ambient temperature (AT), a sensor 252 to detect an engine coolant temperature (ECT), a sensor 259 to detect an engine intercooler temperature (EICT), a sensor 265 to detect an engine cooling fan request (ECFR), a sensor 268 to detect an engine intercooler fan request (EIFR), and a sensor 272 to detect a box temperature (BT). Note that the sensors 222 included in the TRU 110 are not limited to those that are illustrated in FIG. 2A, and include any type or any number of sensors that are suitable for use with the TRU 110.

The TRS Controller 241 can be configured to receive data as input from various components within the TRS 100, e.g., the sensors 222, and send command signals as output to various components within the TRS 100. Generally, the TRS Controller 241 includes a processor (not shown), a memory (not shown), a clock (not shown) and an input/output (I/O) interface (not shown).

Figure 2B:
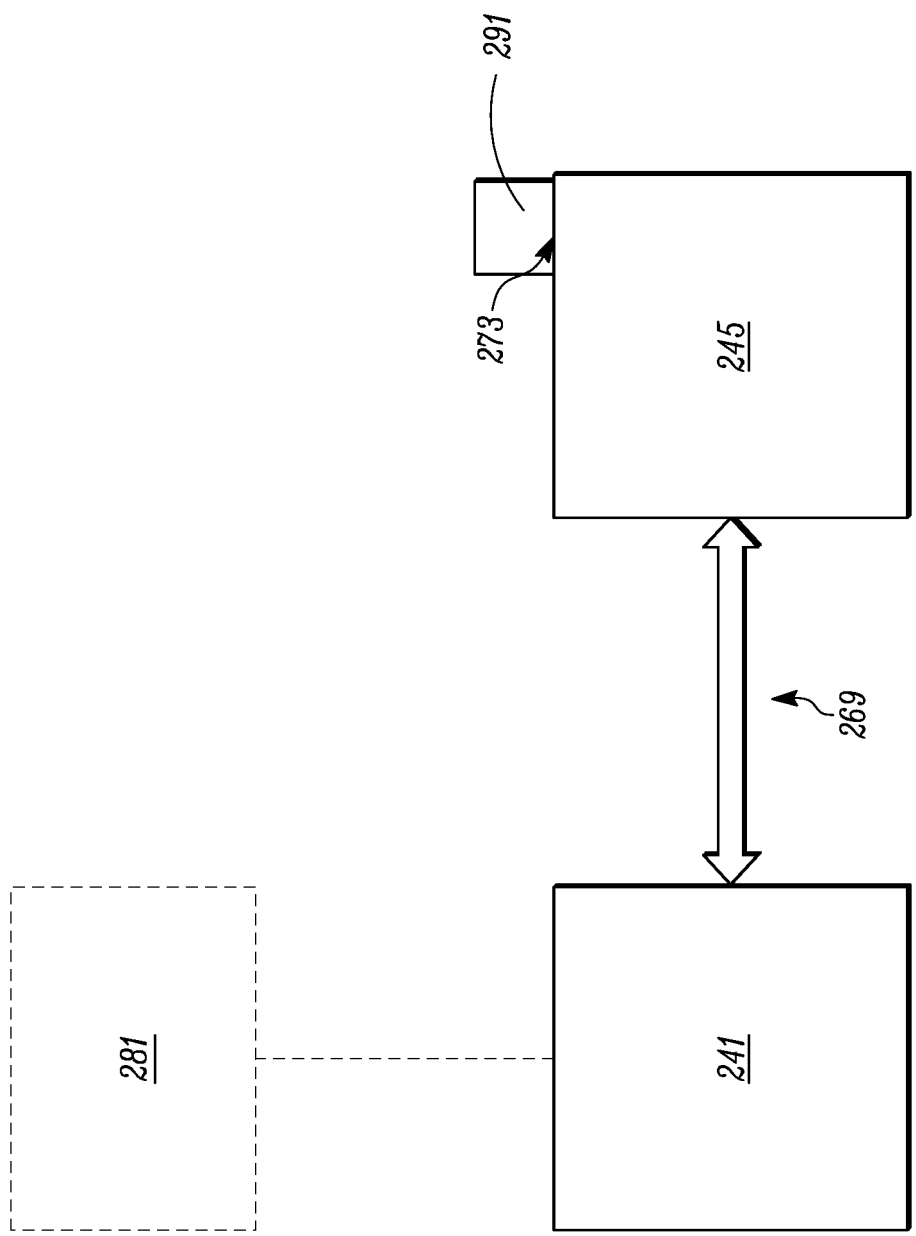
FIG. 2B illustrates a block diagram of some of the components of the TRU in FIG. 2A, according to one embodiment.

With reference to FIGS. 2A and 2B, the TRU 110 further includes a human-machine interface (HMI) 245 that is in communication with the TRS Controller 241 via a communication line 269. In some examples, the communication line is a RS485 communication line.

The HMI 245 includes an interface 273 that is configured to receive and connect with an external device 291. In some examples, the external device 291 is an external storage device. In some examples, the interface 273 is accessible to a user so that a user can detach the external device 291 from the HMI 245. The detached external device 291 then can be connected to another device, e.g., a computer, that is configured to connect with the external device 291 so that the data stored in the external device 291 can be read or exported to the computer. In some examples, the external device 291 can be a USB device and the interface 273 of the HMI 245 can include a Universal Serial Bus (USB) interface that is configured to receive and connect with the USB device. The USB device can be, for example, a USB flash drive. In some examples, the external device 291 can be configured to utilize a communication protocol that is not available on the TRS 100. In this manner, the TRS 100 can communicate directly with an optional secondary device 281 via the external device 291. Examples of the optional secondary device 281 can be, but is not limited to, an external computer, a server and/or a mobile device.

In some examples, the HMI 245 includes a communication protocol to communicate with the device 281 other than the TRS Controller 241, for instance, an external database that is not included in the TRS 100. In some examples, the communication protocol is a wireless communication protocol. The communication protocol can be, for instance, a Bluetooth protocol, a WiFi protocol, a cellular data protocol, a ZigBee protocol, etc.

In one example, during operation, the TRS Controller 241 receives information from the plurality of sensors 222 through the I/O interface as inputs, the TRS Controller 241 optionally processes the received information using the processor based on an algorithm stored in the memory, and then the information and/or the processed information is communicated to the HMI 245 and stored in the external device 291. Optionally, the information and/or the processed information is displayed on the HMI 245. In some examples, the TRS Controller 241 is configured to transmit information to the HMI 245 and/or the external device 291, e.g., the USB device, periodically.

Details of the inputs that are received by the TRS Controller 241 will now be described. The inputs that are received by the TRS Controller 241 can include data of parameters that are typically received when operating the TRS 100, such as a discharge pressure temperature saturation ($DPT_{SAT}$), a minimum pressure temperature saturation ($MPT_{SAT}$), a minimum discharge pressure ($DP_{MIN}$), an ambient temperature (AT), an engine coolant temperature (ECT), an engine intercooler temperature (EICT), an engine cooling fan request (ECFR), an engine intercooler fan request (EIFR) and/or a box temperature (BT). The inputs received by the TRS Controller 241 further can include data regarding certain TRS configurations, such as a temperature set point of the internal space 150.

Details of the various algorithms that can be stored in the memory will now be provided below.

Figure 3:
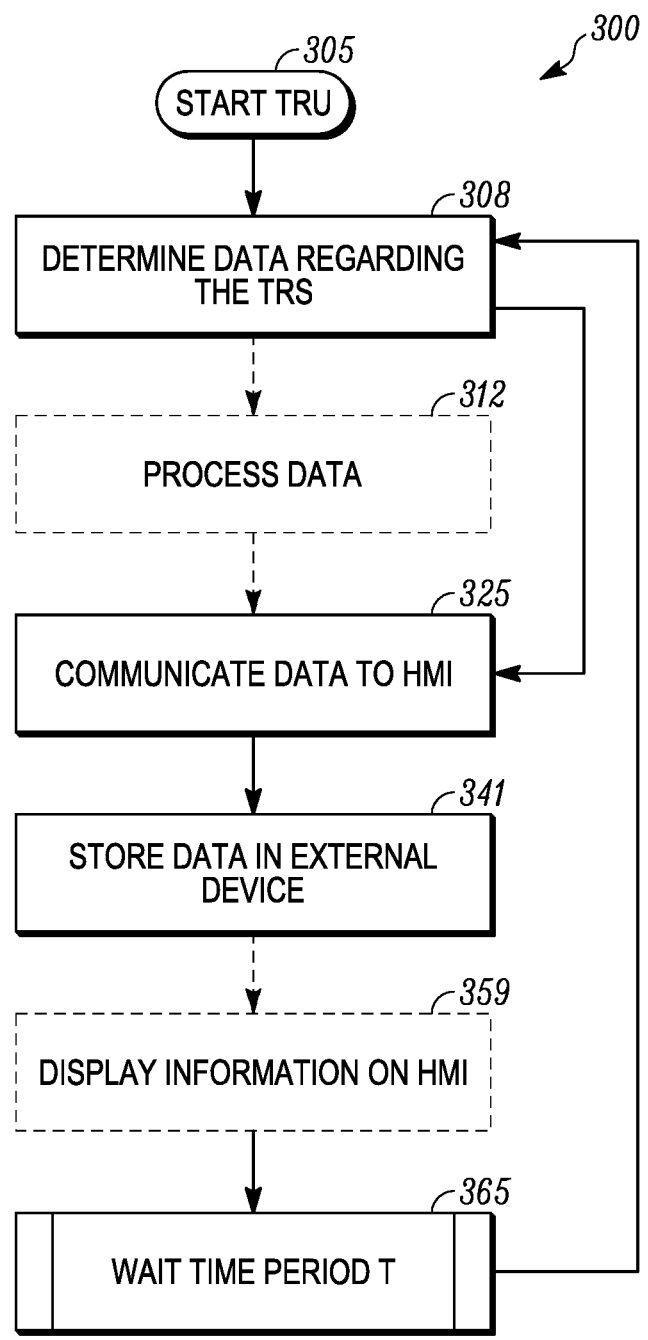
FIG. 3 is a flowchart for the process of controlling the collection and storage of data, according to one embodiment.

Generally, the TRS Controller 241 is configured to implement the disclosed process of controlling the operation of the condenser fans 144a, 144b and the evaporator fan 147 as illustrated in FIG. 3. In general, the process described in FIG. 3 is executed by the processor executing program instructions (algorithms) stored in the memory of the TRS Controller 241.

FIG. 3 illustrates one embodiment of a process 300 for controlling the collection and storage of data. At 305, the TRU 110 is started. The process 300 then proceeds to 308.

At 308, the TRS Controller 241 determines data regarding the TRS 100, e.g., data of parameters that are typically received when operating the TRS 100. In some examples, the parameters can include a discharge pressure temperature saturation ($DPT_{SAT}$), a minimum pressure temperature saturation ($MPT_{SAT}$), a minimum discharge pressure ($DP_{MIN}$), an ambient temperature (AT), an engine coolant temperature (ECT), an engine intercooler temperature (EICT), an engine cooling fan request (ECFR), an engine intercooler fan request (EIFR) and/or a box temperature (BT) using the plurality of sensors 222. In some examples, the data that is determined can include data regarding certain TRS configurations, such as a temperature set point of the internal space.

Optionally, at 312, the data that is determined by the TRS Controller 241 is processed by the TRS Controller 241. In some examples, the data can be processed by determining whether there is a conflict between the parameters, e.g., the $DPT_{SAT}$, the $MPT_{SAT}$, the $DP_{MIN}$, the AT, the ECT, the EICT, the ECFR, the EIFR, the MOTI and/or the box temperature, and predetermined operating conditions. If there is a conflict, an alarm code can be generated as an output. If there is no conflict, then the TRS 100 is operated based on predetermined conditions.

Then, at 325, the data regarding the TRS 100 is communicated to the HMI 245. At 341, the data is stored in the external device 291.

Optionally, at 359, the information that is communicated to the HMI 245 is displayed on the HMI 245. In some examples, the information that is displayed can include a temperature set point of the internal space 150, an alarm code, and/or a box temperature.

Then at 365, the process 300 involves waiting for a predetermined amount of time T. In some examples, T is about 30 seconds to about 5 minutes. The process 300 then goes back to 308.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

ASPECTS

It is appreciated that any of aspects 1-22 can be combined.

Aspect 1. A refrigeration system for controlling the collection and storage of data, comprising:
 a controller; and
 a human-machine interface (HMI) that is connected to the controller,
  wherein the HMI includes an interface that is configured to detachably connect with an external device, and
  wherein the controller is configured to receive information regarding the system, communicate the information to the HMI, and store the information in the external device.

Aspect 2. The refrigeration system of aspect 1, wherein the interface of the HMI includes a Universal Serial Bus (USB) interface that is configured to receive and connect with a USB device.

Aspect 3. The refrigeration system of aspect 2, wherein the USB device is a USB flash drive.

Aspect 4. The refrigeration system of any one of aspects 1-3, wherein the controller is further configured to process the received information, and store the processed information in the external device.

Aspect 5. The refrigeration system of any one of aspects 1-4, wherein the controller is further configured to display the received information and/or processed information on the HMI.

Aspect 6. The refrigeration system of any one of aspects 1-5, wherein the external device is configured to utilize a communication protocol that is otherwise not available on the refrigeration system.

Aspect 7. The refrigeration system of any one of aspects 1-6, wherein the HMI is configured to utilize a communication protocol.

Aspect 8. The refrigeration system of any one of aspects 1-7, wherein the communication protocol is a wireless communication protocol.

Aspect 9. The refrigeration system of any one of aspects 1-8, further comprising at least one selected from the group consisting of a compressor, an evaporator and a condenser.

Aspect 10. A human-machine interface (HMI) for a transport refrigeration system, the HMI comprising an interface that is configured to detachably connect with an external device, and further configured to receive data regarding the refrigeration system and store the data on the external device.

Aspect 11. The HMI of aspect 10, wherein the HMI is configured to utilize a communication protocol to communicate with the external device.

Aspect 12. The HMI of aspect 11, wherein the communication protocol is a wireless communication protocol.

Aspect 13. The HMI of any of aspects 10-12, wherein the HMI is configured to communicate with a controller of the transport refrigeration system via a first communication connection and is configured to communicate with an external device via a second communication connection.

Aspect 14. A method for controlling the collection and storage of data in a refrigeration system, comprising: a human-machine interface (HMI) HMI receiving data regarding the refrigeration system, and the HMI sending the data to an external device that is connected to the HMI, wherein the external device is detachably connected with the HMI.

Aspect 15. The method of aspect 14, further comprising collecting data regarding the refrigeration system using a controller.

Aspect 16. The method of any one of aspects 14 and 15, further comprising processing the data regarding the refrigeration system, and sending the processed data to the external device.

Aspect 17. The method of any one of aspects 14-16, displaying the collected data and/or processed data on the HMI.

Aspect 18. The method of any one of aspects 14-17, further comprising transmitting the collected data to a control center.

Aspect 19. The method of any one of aspects 14-18, further comprising analyzing the collected data using the controller.

Aspect 20. The method of any one of aspects 14-19, wherein analyzing the data includes comparing the collected data to other data of the refrigeration system so as to generate analytics.

Aspect 21. The method of any one of aspects 14-20, further comprising outputting a result regarding the collected data and/or an analysis.

Aspect 22. The method of aspect 21, wherein the result is a set point, an alarm, and/or a temperature.

What is claimed is:

1. A method for data logging in a refrigeration system that includes a plurality of sensors each of which monitoring a parameter of the refrigeration system, a refrigeration system controller, and a human-machine interface (HMI) that is separate from the refrigeration system controller and is connected to the refrigeration system controller via a communication link, wherein the HMI includes a first communication protocol to communicate with an external device, the method comprising:
the refrigeration system controller receiving data from each of the plurality of sensors;
the refrigeration system controller processing the received data including determining if there is a conflict between the received data from one of the plurality of sensors and the received data from another of the plurality of sensors;
the refrigeration system controller transmitting at least one of the received data and the processed data to the HMI that is separate from the refrigeration system controller via the communication link;
the refrigeration system controller displaying at least one of the received data and the processed data on the HMI;
the refrigeration system controller controlling an operating state of the refrigeration system to obtain a desired operating condition based on at least one of the received data and the processed data; and
the refrigeration system controller transmitting, at a predetermined fixed periodic time rate, at least one of the received data and the processed data to the external device via the HMI using the first communication protocol.

2. The method of claim 1, wherein the refrigeration system controller processing the received data includes analyzing the at least one of the received data and the processed data.

3. The method of claim 2, further comprising the refrigeration system controller outputting a result regarding the analysis.

4. The method of claim 3, wherein the result is a set point, an alarm, and/or a temperature.

5. The method of claim 2, wherein analyzing the at least one of the received data and the processed data includes comparing the at least one of the received data and the processed data so as to generate analytics.

6. The method of claim 1, further comprising the refrigeration system controller transmitting, at the predetermined periodic rate, at least one of the received data and the processed data to a control center.

7. The method of claim 1, wherein determining if there is a conflict between the received data from one of the plurality of sensors and the received data from another of the plurality of sensors includes determining if there is a conflict between the received data from one of a sensor to detect a discharge pressure temperature saturation ($DPT_{SAT}$), a sensor to detect a minimum pressure temperature saturation ($MPT_{SAT}$), a sensor to detect a minimum discharge pressure ($DP_{MIN}$), a sensor to detect an ambient temperature (AT), a sensor to detect an engine coolant temperature (ECT), a sensor to detect an engine intercooler temperature (EICT), a sensor to detect an engine cooling fan request (ECFR), a sensor to detect an engine intercooler fan request (EIFR), and a sensor to detect a box temperature (BT) and the received data from another of the sensor to detect the discharge pressure temperature saturation ($DPT_{SAT}$), the sensor to detect the minimum pressure temperature saturation ($MPT_{SAT}$), the sensor to detect the minimum discharge pressure ($DP_{MIN}$), the sensor to detect the ambient temperature (AT), the sensor to detect the engine coolant temperature (ECT), the sensor to detect the engine intercooler temperature (EICT), the sensor to detect the engine cooling fan request (ECFR), the sensor to detect the engine intercooler fan request (EIFR), and the sensor to detect the box temperature (BT).

8. The method of claim 1, wherein the predetermined periodic rate is in a range of between about 30 seconds to about five minutes.

9. A refrigeration system with data logging control, comprising:
a plurality of sensors, each of the plurality of sensors monitoring parameters of the refrigeration system;
a refrigeration system controller configured to receive data from each of the plurality of sensors; and
a human-machine interface (HMI) that is separate from the refrigeration system controller and is connected to the refrigeration system controller via a communication link,
wherein the HMI includes a first communication protocol,
wherein the refrigeration system controller is configured to communicate the received data to the HMI via the communication link, the HMI is configured to communicate the received data to an external device via the first communication protocol, and
wherein the refrigeration system controller is further configured to:
process the received data including determining if there is a conflict between the received data from one of the plurality of sensors and the received data from another of the plurality of sensors,
display at least one of the received data and the processed data on the HMI,
control an operating state of the refrigeration system to obtain a desired operating condition based on at least one of the received data and the processed data, and
transmit at least one of the received data and the processed data to the external device via the HMI device at a predetermined fixed periodic time rate.

10. The refrigeration system of claim 9, wherein the HMI includes a Universal Serial Bus (USB) interface that is configured to connect to and communicate with a USB device.

11. The refrigeration system of claim 10, wherein the USB device is a USB flash drive.

12. The refrigeration system of claim 9, wherein the first communication protocol is a wireless communication protocol.

13. The refrigeration system of claim 9, further comprising at least one selected from the group consisting of a compressor, an evaporator and a condenser.

14. The refrigeration system of claim 9, wherein the refrigeration system controller is configured to determine if there is a conflict between the received data from one of a sensor to detect a discharge pressure temperature saturation ($DPT_{SAT}$), a sensor to detect a minimum pressure temperature saturation ($MPT_{SAT}$), a sensor to detect a minimum discharge pressure ($DP_{MIN}$), a sensor to detect an ambient temperature (AT), a sensor to detect an engine coolant temperature (ECT), a sensor to detect an engine intercooler temperature (EICT), a sensor to detect an engine cooling fan request (ECFR), a sensor to detect an engine intercooler fan request (EIFR), and a sensor to detect a box temperature (BT) and the received data from another of the sensor to detect the discharge pressure temperature saturation ($DPT_{SAT}$), the sensor to detect the minimum pressure temperature saturation ($MPT_{SAT}$), the sensor to detect the minimum discharge pressure ($DP_{MIN}$), the sensor to detect the ambient temperature (AT), the sensor to detect the engine coolant temperature (ECT), the sensor to detect the engine intercooler temperature (EICT), the sensor to detect the engine cooling fan request (ECFR), the sensor to detect the engine intercooler fan request (EIFR), and the sensor to detect the box temperature (BT).

15. The refrigeration system of claim 9, wherein the predetermined periodic rate is in a range of between about 30 seconds to about five minutes.

* * * * *